United States Patent
Nakamura et al.

(10) Patent No.: US 10,814,719 B2
(45) Date of Patent: Oct. 27, 2020

(54) SPEED REDUCER, DRIVING WHEEL, AND CARRIAGE

(71) Applicant: NABTESCO CORPORATION, Tokyo (JP)

(72) Inventors: Koji Nakamura, Tsu (JP); Takashi Naruse, Tsu (JP)

(73) Assignee: NABTESCO CORPORATION, Tokyo (JP)

( * ) Notice: Subject to any disclaimer, the term of this patent is extended or adjusted under 35 U.S.C. 154(b) by 163 days.

(21) Appl. No.: 15/910,462

(22) Filed: Mar. 2, 2018

(65) Prior Publication Data

US 2018/0251025 A1 Sep. 6, 2018

(30) Foreign Application Priority Data

Mar. 6, 2017 (JP) .................... 2017-041936

(51) Int. Cl.
*B60K 17/04* (2006.01)
*B60K 1/00* (2006.01)
(Continued)

(52) U.S. Cl.
CPC .............. *B60K 17/046* (2013.01); *B60K 1/00* (2013.01); *B60K 7/0007* (2013.01); *F16H 57/025* (2013.01); *F16H 57/03* (2013.01); *B60K 2007/0092* (2013.01); *B60Y 2200/62* (2013.01); *F16H 1/28* (2013.01); *F16H 2057/02034* (2013.01)

(58) Field of Classification Search
CPC ....... B60K 17/046; B60K 1/00; B60K 7/0007
See application file for complete search history.

(56) References Cited

U.S. PATENT DOCUMENTS

| 2,618,175 | A | | 4/1946 | Bruce | |
| 3,596,729 | A | * | 8/1971 | Shaw | B60K 7/00 180/55 |

(Continued)

FOREIGN PATENT DOCUMENTS

| DE | 1904831 A1 * | 9/1969 | ........... B60K 17/046 |
| DE | 4134840 A1 | 4/1993 | |

(Continued)

OTHER PUBLICATIONS

Search Report dated Apr. 14, 2020 issued in corresponding German Patent Application No. 10 2018 202 950.4 with English translation.

*Primary Examiner* — Thomas C Diaz
(74) *Attorney, Agent, or Firm* — Pillsbury Winthrop Shaw Pittman, LLP (57) ABSTRACT

A speed reducer which decelerates rotation input from a motor and outputs decelerated rotation to a wheel includes: a case fixed to a carriage body; an input portion for receiving the rotation input from the motor; an output portion for outputting the rotation to the wheel; and a speed reducing mechanism at least partially housed in the case and configured to decelerate rotation of the input portion and transmit the decelerated rotation to the output portion. The maximum outer radius of the case from the rotation axis of the output portion is larger than the radius of the wheel, and the minimum outer radius of the case from the rotation axis of the output portion is smaller than the radius of the wheel.

7 Claims, 3 Drawing Sheets

(51) Int. Cl.
*B60K 7/00* (2006.01)
*F16H 57/025* (2012.01)
*F16H 57/03* (2012.01)
F16H 57/02 (2012.01)
F16H 1/28 (2006.01)

(56) References Cited

U.S. PATENT DOCUMENTS 6,053,837 A * 4/2000 Auer .................... B60K 17/046
180/24.11
10,207,751 B2 * 2/2019 Milton ..................... B60G 3/06

FOREIGN PATENT DOCUMENTS

DE 10219922 A1 * 11/2003 ........... B60K 7/0007
JP 62-59348 U 4/1987

* cited by examiner

SPEED REDUCER, DRIVING WHEEL, AND CARRIAGE

CROSS-REFERENCE TO RELATED APPLICATIONS

This application is based on and claims the benefit of priority from Japanese Patent Application Serial No. 2017-041936 (filed on Mar. 6, 2017), the contents of which are hereby incorporated by reference in their entirety.

TECHNICAL FIELD

The present invention relates to a speed reducer, and a driving wheel and a carriage including the speed reducer.

BACKGROUND

Carriages propelled by motors are widely used in various applications. Not only manned controlled carriages but also unmanned carriages such as Rail Guided Vehicles (RGVs) and Automatic Guided Vehicles (AGVs) are known. The power output from a motor in these carriages is transmitted to a wheel via a speed reducer and causes the carriages to travel. The speed reducer decelerates the power output from the motor and outputs a decelerated power with an increased torque.

Typically, a speed reducer having a larger output tends to have a larger size. The size of a speed reducer as observed from the direction parallel to the rotation axis thereof is limited so as to be smaller than the outer diameter of a wheel to which the speed reducer is mounted. When the size of a speed reducer is larger than the outer diameter of the wheel, the speed reducer contacts with a traveling surface of the wheel and hinders the traveling of the carriage. As a result, the output of the speed reducer is limited in accordance with the outer diameter of the wheel to which the speed reducer is mounted.

SUMMARY

The present invention addresses the above problem, and one object thereof is to provide a speed reducer with reduced limitation of the size thereof based on the outer diameter of the wheel and to provide a driving wheel and a carriage including the speed reducer.

A first driving wheel according to the present invention comprises: a wheel; and a speed reducer that decelerates rotation input thereto and outputs decelerated rotation to the wheel, wherein a part of a case of the speed reducer facing a traveling surface is positioned closer to a rotation axis of the wheel than is an outer edge of the wheel, and another part of the case other than the part is positioned more distant from the rotation axis than is the outer edge of the wheel.

In the first driving wheel according to the present invention, the speed reducer may include a speed reducing mechanism and a case at least partially housing the speed reducing mechanism. The speed reducing mechanism decelerates rotation input thereto and outputs decelerated rotation.

In the first driving wheel according to the present invention, the part of the case facing the traveling surface may include a plane surface or a curved surface having a radius of curvature larger than a distance from the rotation axis to the part.

In the first driving wheel according to the present invention, a part of the case opposite to a side facing the traveling surface may be positioned closer to the rotation axis of the wheel than is the outer edge of the wheel.

In the first driving wheel according to the present invention, the case may be mounted to a carriage body such that the part of the case opposite to the side facing the traveling surface contacts with the carriage body.

In the first driving wheel according to the present invention, the other part other than the part may be positioned at a distance from the rotation axis in a direction parallel to the traveling surface.

In the first driving wheel according to the present invention, the case may be provided with a reinforcement portion.

In the first driving wheel according to the present invention, the reinforcement portion includes at least one of an extension portion extending in a direction parallel to the traveling surface and a thick portion disposed close to the part facing the traveling surface.

A speed reducer according to the present invention is a speed reducer that decelerates rotation input from a motor and outputs decelerated rotation to a wheel, the speed reducer comprising: a case fixed to a carriage body; an input portion that receives the rotation input from the motor; an output portion that outputs the decelerated rotation to the wheel; and a speed reducing mechanism at least partially housed in the case, the speed reducing mechanism decelerating rotation of the input portion and transmitting the decelerated rotation to the output portion, wherein a maximum distance from a rotation axis of the output portion to an outer edge of the case along radial directions perpendicular to the rotation axis of the output portion is larger than a radius of the wheel, and wherein a minimum distance from the rotation axis of the output portion to the outer edge of the case along the radial directions perpendicular to the rotation axis of the output portion is smaller than the radius of the wheel.

In this speed reducer, the bottom portion of the case may include a cut surface.

The top portion of the case may include a cut surface.

The top portion of the case may be in contact with the carriage body.

The case may be provided with a reinforcement portion.

The reinforcement portion may include at least one of an extension portion extending in the front-rear direction and a thick portion disposed close to the cut surface.

A second driving wheel according to the present invention comprises: the speed reducer described above; and a wheel connected to the speed reducer.

A carriage according to the present invention comprises the speed reducer described above or the first or second driving wheel described above.

The present invention makes it possible to reduce the limitation of the size of the speed reducer based on the outer diameter of the wheel.

DESCRIPTION OF THE PREFERRED EMBODIMENTS

An embodiment of the present invention will now be described with reference to the drawings. The accompanying drawings are simplified and the elements in the drawings are not necessarily drawn to scale, and the dimensional ratio between the elements and shapes of the elements may be different from the actual ones. However, from such simplified drawings, the embodiments described below and other embodiments of the present invention would be sufficiently understood by those skilled in the art.

Figure 1:
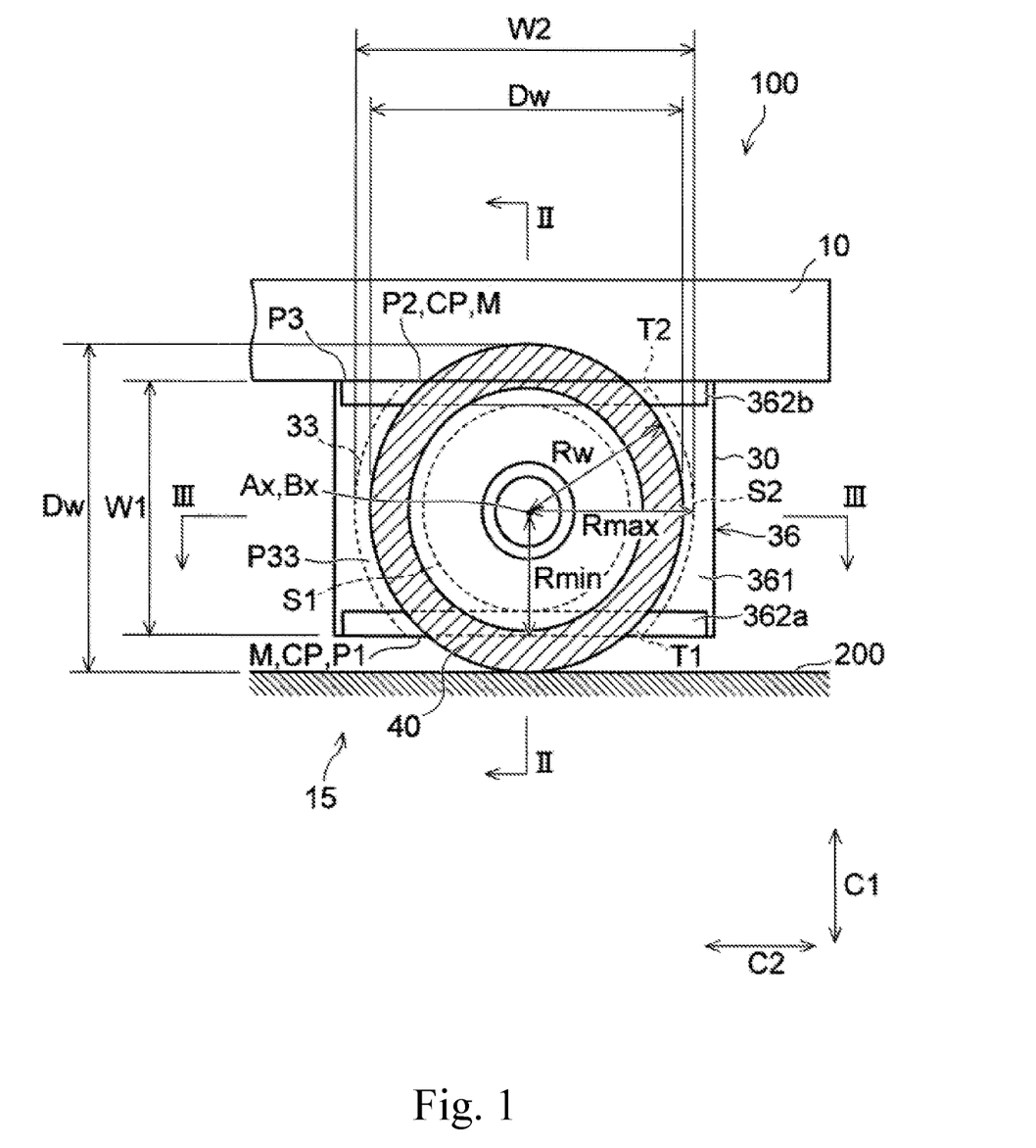
FIG. 1 shows a driving wheel mounted to a carriage, according to an embodiment of the present invention.
Figure 2:
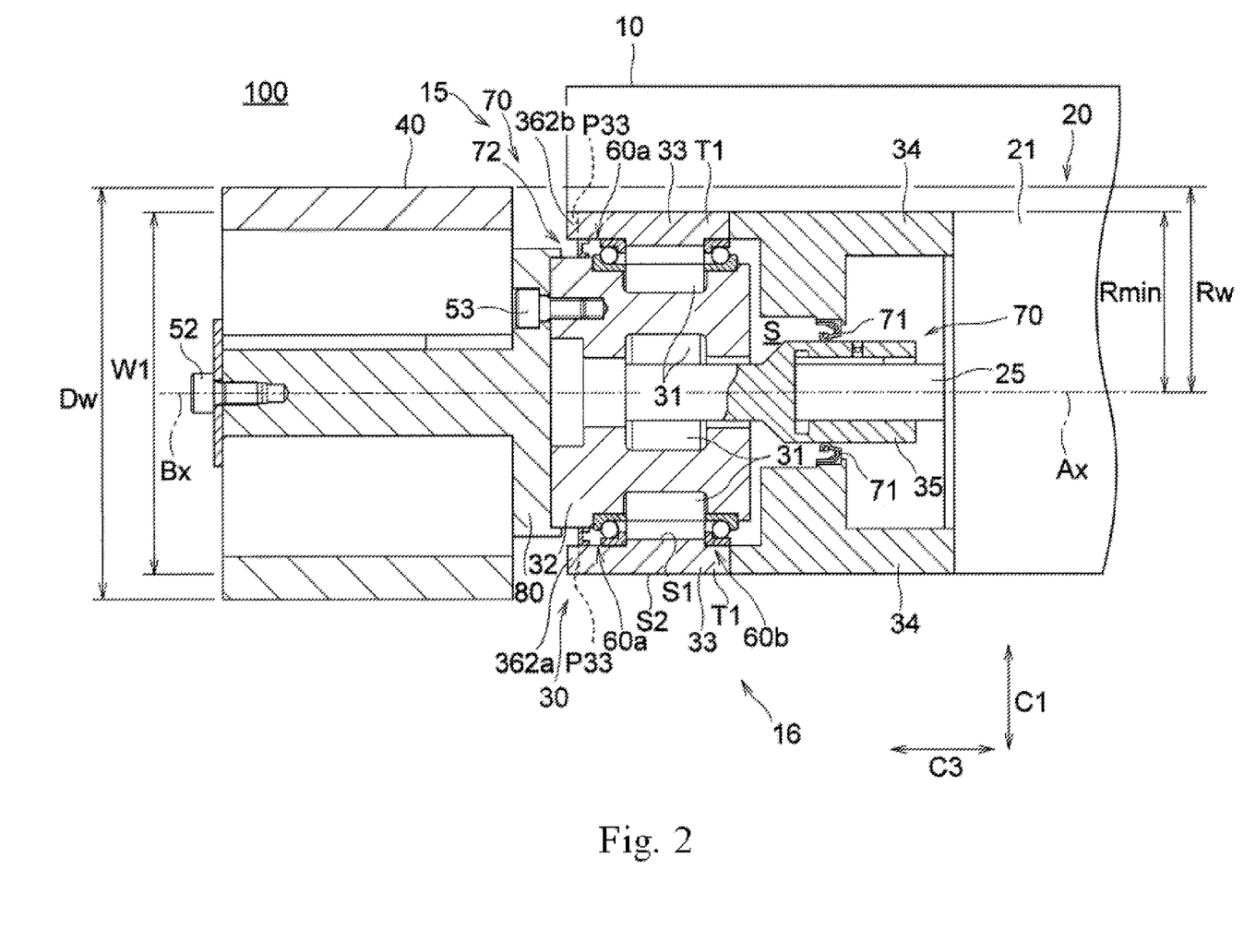
FIG. 2 is a sectional view of the driving wheel of FIG. 1 along the line II-II.
Figure 3:
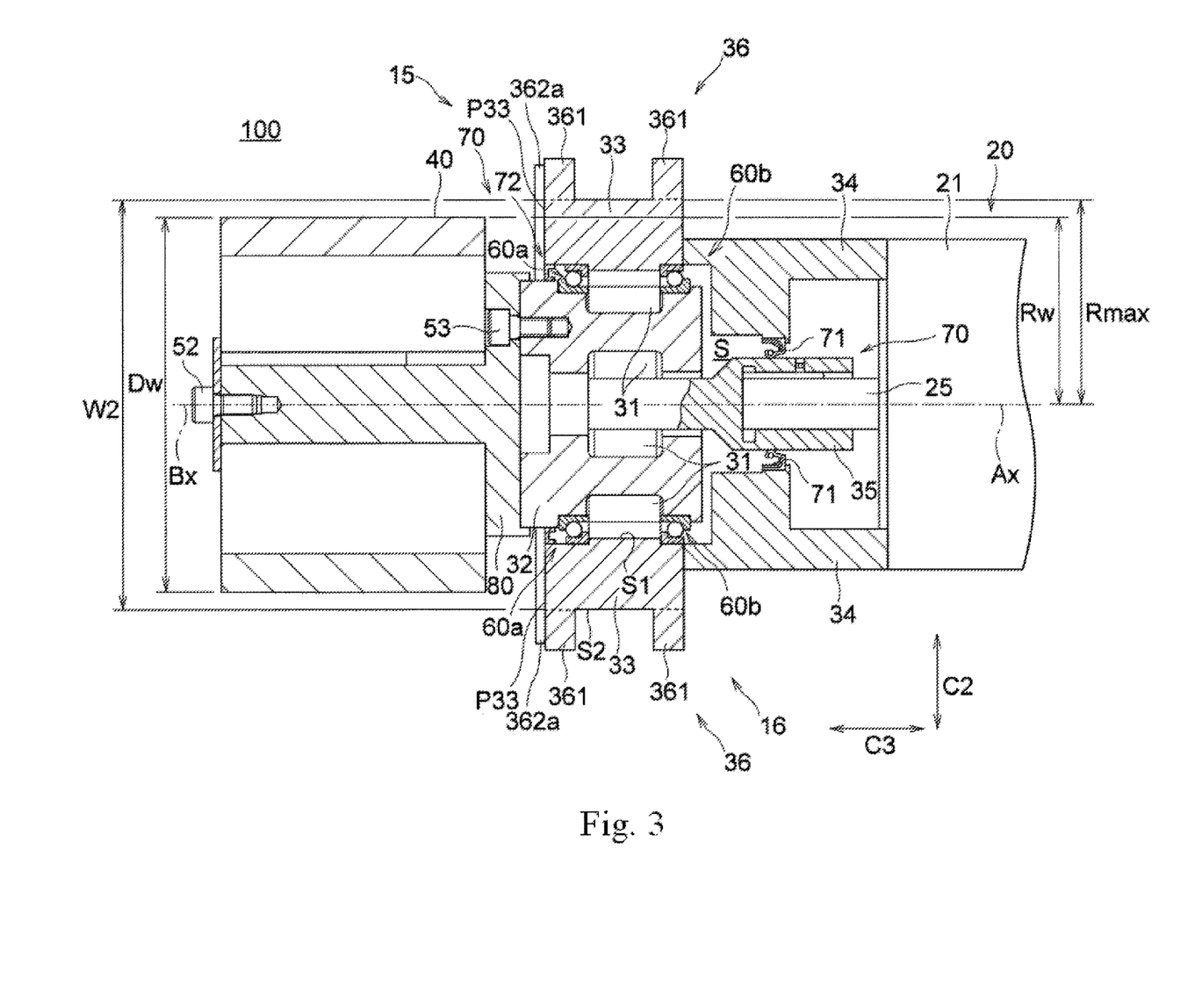
FIG. 3 is a sectional view of the driving wheel of FIG. 1 along the line III-III.

FIG. 1 shows a driving wheel mounted to a carriage according to an embodiment of the present invention. The driving wheel is observed from the direction parallel to the rotation axis thereof. FIG. 2 and FIG. 3 are sectional views of the driving wheel of FIG. 1 along the line II-II and the line III-III, respectively.

As shown in FIG. 1, the carriage 100 includes a carriage body 10 and a driving wheel 15 mounted to the carriage body 10. The carriage 100 travels on a traveling surface 200. As shown in FIGS. 2 and 3, a motor 20 is connected to the driving wheel 15 to constitute a driving device 16. The driving wheel 15 includes a wheel 40 and a speed reducer 30 connected to the wheel 40. The speed reducer 30 decelerates the power, or the rotation, input from the motor 20, and outputs a decelerated power to the wheel 40 mounted to the speed reducer 30, so as to cause rotation of the wheel 40.

As shown in FIGS. 2 and 3, the speed reducer 30 includes: a case 33 fixed to the carriage body 10; an input portion 35 for receiving the power (rotation) input from the motor 20; an output portion 32 for outputting the rotation to the wheel 40; and a speed reducing mechanism 31 at least partially housed in the case 33 and configured to decelerate the rotation of the input portion 35 and transmit the decelerated rotation to the output portion 32. In the example shown in FIGS. 2 and 3, the speed reducer 30 further includes a base 34 that supports the motor 20.

As shown in FIGS. 1 and 2, a top portion of the case 33 is mounted to the bottom surface of the carriage body 10 via a fastening member (not shown). The case 33 fixed to the carriage body 10 is either directly mounted to the carriage body 10 or indirectly mounted via a connecting part mounted to the carriage body 10.

The words "top," "bottom," "front," "rear," "top-bottom direction," and "front-rear direction" used herein for the case, the speed reducer, or the driving wheel refer to the "top," the "bottom," the "front," the "rear," the "top-bottom direction," and the "front-rear direction" recognized when the carriage including the driving wheel is placed on a traveling surface and advanced, unless otherwise specified. More specifically, the "top-bottom direction" refers to the top-bottom direction in the page of FIG. 1, and the "front-rear direction" refers to the left-right direction in the page of FIG. 1. The word "width direction" used herein for the driving wheel or the speed reducer refers to the direction perpendicular to both the "top-bottom direction" and the "front-rear direction." More specifically, the "width direction" refers to the direction vertical to the page of FIG. 1, The case 33 and the base 34 have a substantially tubular shape and extend in the direction of the rotation axis Ax of the motor 20. A body 21 of the motor 20 is mounted on one end of the base 34 via a fastening member (not shown). On the other end of the base 34, there is fixed one end of the case 33 via a fastening member (not shown).

Inside the case 33 and the base 34 in the radial directions from the rotation axis Ax, there is provided an input portion 35 that extends in the direction parallel to the rotation axis Ax. Further, inside the case 33 in the radial directions from the rotation axis Ax, there are provided the speed reducing mechanism 31 and a part of the output portion 32. The output portion 32 supports the speed reducing mechanism 31 and is rotatable relative to the case 33. In the example shown, the rotation axis Ax is parallel to the width direction, and the radial directions are perpendicular to the rotation axis Ax.

The input portion 35 serves as an input gear that inputs power from the motor 20 to the speed reducing mechanism 31. More specifically, one end of the input portion 35 is connected to an output shaft 25 of the motor 20. This enables the input portion 35 to rotate around the rotation axis Ax integrally with the output shaft 25 of the motor 20. Thus, the power (rotation) output from the motor 20 is transmitted to the input portion 35. The input portion 35 inputs, at the other end thereof, the power from the motor 20 to the speed reducing mechanism 31.

The body 21 and the output shaft 25 of the motor 20 are removably mounted on the base 34 and the input portion 35, respectively. Therefore, the motor 20 can be replaced when necessary.

The speed reducing mechanism 31 decelerates power (rotation) that is input from the input portion 35 and transmits the power with an increased torque to a carrier supporting the speed reducer 31 or the case 33 housing the carrier. In the example shown in FIG. 2, the case 33 is fixed on the carriage body 10, and therefore, the carrier serves as an output portion 32, and the speed reducing mechanism 31 transmits the power to the output portion 32 to rotate the output portion 32.

In the example shown in FIG. 2, the speed reducer 30 is configured as an eccentric oscillating speed reducer. On the inner peripheral surface of the case 33, there are formed internal teeth arranged along the circumferential direction. The speed reducing mechanism 31 is constituted by an eccentric oscillating gear having external teeth meshing with the internal teeth of the case 33. The eccentric oscillating gear that constitutes the speed reducing mechanism 31 is supported by the carrier that constitutes the output portion 32 so as to be capable of oscillating eccentrically. The eccentric oscillating gear that constitutes the speed reducing mechanism 31 oscillates eccentrically relative to the carrier in accordance with the rotation of the input portion 35. In this eccentric oscillation, the external teeth of the eccentric oscillating gear mesh with the internal teeth of the case 33, and the carrier supporting the speed reducing mechanism 31 rotates relative to the case 33. An eccentric oscillating speed reducer typically has a small backlash that makes it possible to reduce malfunctions of the whole driving wheel 15. The speed reducer 30 is not necessarily an eccentric oscillating speed reducer but may be other types of speed reducers. For example, the speed reducer 30 may be a planetary gear speed reducer or may be constituted by a speed reducing structure in which a planetary gear speed reducer and an eccentric oscillating speed reducer are combined together. Alternatively, the speed reducer 30 may be constituted by other desired types of speed reducing structures. When the speed reducer 30 is a planetary gear speed reducer, by way of an example, it is possible that the input portion is constituted by a sun gear, the speed reducing mechanism 31 is constituted by planetary gears having external teeth meshing with the internal teeth of the case 33, and the output portion 32 is constituted by a carrier that rotatably supports the planetary gears and is rotatable relative to the case 33.

The output portion 32 is connected to the case 33 via a pair of bearings 60a, 60b disposed between the output portion 32 and the case 33, so as to be rotatable relative to the case 33. In the example shown in FIGS. 2 and 3, the speed reducing mechanism 31 meshes with the case 33 fixed stationary, and therefore, the output portion 32 rotates around the rotation axis Ax at a reduced rotation speed along with the speed reducing mechanism 31. The output portion 32 is also restrained by the pair of bearings 60a, 60b from moving in the direction parallel to the rotation axis Ax relative to the case 33.

The pair of bearings 60a, 60b also withstand the loads imparted to the output portion 32 and the case 33. For example, when the carriage 100 travels straight, the output portion 32 and the case 33 may be subjected to a radial load imparted from the wheel 40. When the carriage 100 turns, the output portion 32 and the case 33 may be subjected to a thrust load in addition to the radial load imparted from the wheel 40. The radial direction mentioned herein refers to the radial directions from the rotation axis Ax. The thrust direction mentioned herein refers to the direction in which the rotation axis Ax extends. The pair of bearings 60a, 60b can receive both the thrust load and the radial load between the output portion 32 and the case 33. Since the pair of bearings 60a, 60b thus configured are disposed between the output portion 32 and the case 33, the thrust load and the radial load are prevented from being transmitted to components of the speed reducer 30 such as the speed reducing mechanism 31. As a result, the life span of the speed reducer 30 can be elongated.

In the example shown in FIGS. 2 and 3, the pair of bearings 60a, 60b are angular ball bearings, and these bearings are not necessarily angular ball bearings but may be other types of bearings. For example, the pair of bearings 60a, 60b may be cylindrical roller bearings having rolling elements that are rotatable around an axis parallel to the rotation axis Bx of the wheel 40. In this case, the pair of bearings 60a, 60b can receive at least the radial load. As a result, the radial load is prevented from being transmitted to components of the speed reducer 30 such as the speed reducing mechanism. As a result, the life span of the speed reducer 30 can be elongated.

On the other end of the output portion 32, there is fixed a connector 80 via a fastening member 53 such as a bolt. The connector 80 connects the wheel 40 to the output portion 32. The wheel 40 is fixed to the connector 80 via a fastening member 52 such as a bolt.

As shown in FIG. 1, the wheel 40 is fixed on the connector 80 of the output portion 32 such that rotation axis Bx of the wheel 40 is aligned with the rotation axis Ax of the output portion 32.

The internal space S surrounded by the base 34, the case 33, and the output portion 32 is sealed by a seal portion 70. The seal portion 70 in the embodiment includes a first seal element 71 that seals between the base 34 and the input portion 35, and a second seal element 72 that seals between the case 33 and the output portion 32. The speed reducing mechanism 31 and the bearings 60a, 60b are disposed in the internal space S sealed and closed by the seal portion 70.

Next, the case will be described in further detail.

As described above, a large-sized speed reducer can be used to increase the output from the speed reducer. However, a large-sized speed reducer 30 requires the wheel to have a large diameter to prevent interference between the speed reducer and the traveling surface, resulting in a larger height of the carriage. When the height of the carriage is not large enough, the speed reducer contacts with the traveling surface, which inhibits traveling of the carriage.

By contrast, in the carriage 100 described herein, the case 33 is advantageously configured to restrict the increase of the size of the wheel 40 for a smaller height of the carriage while ensuring a large output with use of a large-sized speed reducer 30. More specifically, the distance from the rotation axis Ax of the wheel 40 to a part of the outer edge of the case 33 along the radial directions perpendicular to the rotation axis Ax is larger than the radius Rw of the wheel 40, and the case 33 is provided with a means M for preventing a contact between the case 33 and the traveling surface 200. The case 33 will now be described in detail.

As described above, the case 33 has a substantially tubular shape. As is understood from FIGS. 1 to 3, the inner profile S1 of the case 33 is formed by the internal teeth meshing with the speed reducing mechanism 31, and the distance from the rotation axis Ax of the output portion 32 to the tip of each of the internal teeth is constant. By contrast, the distance from the rotation axis Ax to the outer profile (outer edge) S2 of the case 33 is not constant. More specifically, the maximum outer radius Rmax of the case 33 from the rotation axis Ax of the output portion 32 is larger than the radius Rw of the wheel 40 (see FIGS. 1 and 3), and the minimum outer radius Rmin of the case 33 from the rotation axis Ax of the output portion 32 is smaller than the radius Rw of the wheel 40 (see FIGS. 1 and 2).

The "maximum outer radius of the case from the rotation axis of the output portion" mentioned herein refers to the maximum distance from the rotation axis of the output portion to the outer profile (outer edge) of the case along the radial directions from the rotation axis of the output portion. The "minimum outer radius of the case from the rotation axis of the output portion" mentioned herein refers to the minimum distance from the rotation axis of the output portion to the outer profile (outer edge) of the case along the radial directions from the rotation axis of the output portion.

A further detailed description is given with reference to FIG. 1. The width W2 of the case 33 along the front-rear direction C2 of the carriage 100 is larger than the diameter Dw of the wheel 40. The width W1 of the case 33 along the top-bottom direction C1 of the carriage 100 is larger than the diameter Dw of the wheel 40.

In other words, a part of the case 33 of the speed reducer 30 facing the traveling surface 200 (this part may be herein referred to as "the traveling surface-facing part") is positioned closer to the rotation axis Bx of the wheel 40 than is the outer edge of the wheel 40, and another part of the case 33 (this part may be herein referred to as "the traveling surface-non-facing part") other than the above part (the traveling surface-facing part) is positioned more distant from the rotation axis Bx than is the outer edge of the wheel 40. When observed from a direction parallel to the rotation axis Bx as shown in FIG. 1, the part of the case 33 facing the traveling surface 200 may include a plane surface or a curved surface having a radius of curvature larger than the distance from the rotation axis Bx to the part. Further, when observed from a direction parallel to the rotation axis Bx as shown in FIG. 1, the other part of the case 33 other than the above part may be positioned at a distance from the rotation axis Bx in a direction parallel to the traveling surface 200.

In the example shown, the bottom portion of the case 33 includes a cut surface P1. The "cut surface" mentioned herein refers to a surface having an outer profile discontinuous to those of other portions. When observed from a direction parallel to the rotation axis of the output portion, a typical cut surface is a flat surface or a curved surface having a larger diameter than a circular arc centered at the rotation axis of the output portion. In the example shown in FIG. 1, the cut surface P1 is a flat surface, or more specifically, a flat surface extending in the front-rear direction.

Further, when observed from a direction parallel to the rotation axis Bx as shown in FIG. 1, a part of the case 33 opposite to the side facing the traveling surface 200 may be positioned closer to the rotation axis Bx of the wheel 40 than is the outer edge of the wheel 40. Further, the case 33 may be mounted to the carriage body 10 such that the part of the case 33 opposite to the side facing the traveling surface 200 contacts with the carriage body 10.

In the example shown in FIG. 1, the top portion of the case 33 also includes a flat cut surface P2. The case 33 contacts with a bottom surface of the carriage body 10 at the cut surface P2. The cut surface P2 is not necessarily a flat surface but may be a curved surface. When the case 33 is mounted to the carriage body 10 via a connecting part, the cut surface P2 is formed such that it can contact with the connecting part. Since the cut surface P2 is formed in the top portion of the case 33, the speed reducer 30 can be mounted to low-floor carriages. Further, since the cut surface P2 is contacted with the carriage body 10 or the connecting part, the portion of the case 33 having the cut surface P2 formed therein and thus having a reduced thickness can be reinforced with the carriage body 10 or the connecting part.

The cut surfaces P1, P2 constitute the means M for preventing a contact between the case 33 and the traveling surface 200. That is, the means M for preventing a contact between the case 33 and the traveling surface 200 may be formed as a cutout portion CP. The cutout portion CP forms a surface that appears straight when observed from a direction parallel to the rotation axes Ax, Bx, or the cutout portion CP forms a curved line having a radius of curvature larger than the distance from the rotation axes Ax, Bx when observed from a direction parallel to the rotation axes Ax, Bx. In the example shown in FIG. 1, the cutout portion CP appears straight when observed from a direction parallel to the rotation axes Ax, Bx. The cutout portion CP is provided in a region of the case 33 facing the traveling surface 200 to form the cut surface P1, and is provided in a region of the case 33 facing the carriage body 10 to form the cut surface P2. The terms "cutout portion" and "cut surface" merely refer to regions and does not specify the method of producing the regions. Accordingly, the "cutout portion" and the "cut surface" refer not only to a part and a surface obtained by cutting but also to a part and a surface obtained by casting or forging.

The parts of the case 33 including the cut surfaces P1, P2 form thin portions T1, T2 having a smaller thickness than other parts. The case 33 is provided with a reinforcement portion 36 to increase the rigidity of the case 33 having the thin portions T1, T2. The reinforcement portion 36 includes an extension portion 361 extending in the front-rear direction C2 as shown in FIG. 1 from one end of the case 33 on the base 34 side and the other end of the case 33 on the wheel 40 side along the rotation axis Ax, as shown in FIG. 3. The extension portion 361 is integrated with the case 33. The top end surface of the extension portion 361, or the surface thereof on the carriage body 10 side, is a flat surface flush with the cut surface P2. The top end surface of the extension portion 361 contacts with the carriage body 10.

Further, as shown in FIGS. 1 and 2, the reinforcement portion 36 includes thick portions 362a, 362b disposed close to the cut surfaces P1, P2, respectively. The thick portions 362a, 362b project in the width direction C3 from the surface P33 of the case 33 on the wheel 40 side. The thick portions 362a, 362b are integrated with the case 33. When observed from a direction parallel to the rotation axis Ax of the output portion 32, the thick portion 362a disposed close to the cut surface P1 overlaps with the thin portion T1 close to the cut surface P1. Also, when observed from a direction parallel to the rotation axis Ax of the output portion 32, the thick portion 362b disposed close to the cut surface P2 overlaps with the thin portion T2 close to the cut surface P2.

The driving device 16 including the speed reducer 30 is mounted to the carriage body 10 to construct the carriage 100. The above-described speed reducer 30 is applicable to all kinds of carriages in which power from the motor 20 is transmitted to the wheel 40 via the speed reducer 30. For example, the speed reducer 30 of the invention can be applied not only to carriages that require assistance by an operator when traveling but also to carriages such as AGVs or RGVs that do not require assistance by an operator when traveling (i.e., an unmanned conveyance vehicle).

The speed reducer 30 according to the embodiment described above, which decelerates rotation input from the motor 20 and outputs the decelerated rotation to the wheel 40, includes: a case 33 fixed to the carriage body 10; an input portion 35 for receiving the rotation input from the motor 20; an output portion 32 for outputting the rotation to the wheel 40; and a speed reducing mechanism 31 at least partially housed in the case 33 and configured to decelerate the rotation of the input portion 35 and transmit the decelerated rotation to the output portion 32. The case 33 is provided with the means M for preventing a contact between the case 33 and the traveling surface 200. The distance from the rotation axis Bx of the wheel 40 to a part of the outer edge of the case 33 along the radial directions perpendicular to the rotation axis Bx is larger than the radius Rw of the wheel 40. In addition, the maximum outer radius Rmax of the case 33 from the rotation axis Ax of the output portion 32 is larger than the radius Rw of the wheel 40, and the minimum outer radius Rmin of the case 33 from the rotation axis Ax of the output portion 32 is smaller than the radius Rw of the wheel 40. In the speed reducer 30 described above, a part of the case 33 of the speed reducer 30 facing the traveling surface 200 is positioned closer to the rotation axis Bx of the wheel 40 than is the outer edge of the wheel 40, and another part of the case 33 other than the above part is positioned more distant from the rotation axis Bx than is the outer edge of the wheel 40.

In the speed reducer 30 thus configured, the maximum dimension W2 of the outer profile S2 of the case 33 as observed from a direction parallel to the rotation axis Ax can be larger than the diameter Dw of the wheel 40. In addition, the dimension of the inner profile S1 of the case 33 as observed from a direction parallel to the rotation axis Ax can be set in accordance with the maximum dimension W2 of the outer profile S2. Thus, the dimension of the speed reducing mechanism 31 which is at least partially housed in the case 33 can be set in accordance with the dimension of the inner profile S1 of the case 33, and thus in accordance with the maximum dimension W2 of the outer profile S2. As a result, the output of the speed reducer 30 can be larger than that of a speed reducer having a dimension in accordance with the diameter Dw of the wheel 40.

The means M for preventing a contact between the case 33 and the traveling surface 200 may be constituted by the cutout portion CP that forms a surface appearing straight when observed from a direction parallel to the rotation axes Ax, Bx of the wheel 40, or a curved line having a radius of curvature larger than the distance from the rotation axes Ax, Bx when observed from a direction parallel to the rotation axes Ax, Bx of the wheel 40. The cutout portion CP may be constituted by the cut surfaces P1, P2.

More specifically, in the embodiment, the bottom portion of the case 33 includes the cut surface P1. That is, the cutout portion CP is disposed in a region of the case 33 facing the traveling surface 200. For example, the part of the case 33 facing the traveling surface 200 may include a plane surface or a curved surface having a radius of curvature larger than the distance from the rotation axis Bx to the part. Since the bottom portion of the case 33 includes the cut surface P1, the maximum dimension W2 of the outer profile S2 of the case 33 as observed from a direction parallel to the rotation axis Ax can be larger than the diameter Dw of the wheel 40, while effectively preventing the case 33 from contacting with the traveling surface 200 on which the wheel 40 travels and inhibiting traveling of the carriage 100.

In the embodiment, the top portion of the case 33 includes the cut surface P2. That is, the cutout portion CP is disposed in a region of the case 33 facing the carriage body 10. For example, a part of the case 33 opposite to the side facing the traveling surface 200 may be positioned closer to the rotation axis Bx of the wheel 40 than is the outer edge of the wheel 40. Thus, the speed reducer 30 can be mounted to a low-floor carriage in which the height of the carriage body 10 is low.

In the embodiment having the above arrangement, the top portion of the case 33 may contact with the carriage body 10. That is, the cutout portion CP or the cut surface P2 may contact with the carriage body 10. For example, the part of the case 33 opposite to the side facing the traveling surface 200 may contact with the carriage body. Thus, the case 33 can be reinforced with the carriage body 10 even when the top portion of the case 33 includes the cut surface P2 and thus the rigidity of the case 33 is lower than the desired rigidity.

In the example shown, a part of the outer edge of the case 33 positioned on the side more distant from the rotation axis Bx than is the outer edge of the wheel 40 when observed from a direction parallel to the rotation axis Bx is positioned at a distance from the rotation axis Bx in a direction parallel to the traveling surface 200. In this example, the output of the speed reducer 30 can be significantly larger than that of a speed reducer having a dimension in accordance with the diameter Dw of the wheel 40.

In the embodiment, the case 33 is provided with the reinforcement portion 36. More specifically, the reinforcement portion 36 includes at least one of the extension portion 361 extending in the front-rear direction C2 and the thick portions 362a, 362b disposed close to the cut surfaces P1, P2. Thus, the case 33 can be reinforced with the reinforcement portion 36 even when the case 33 provided with the cut surfaces P1, P2 has a rigidity lower than the desired rigidity.

The driving wheel 15 according to the embodiment includes the speed reducer 30 described above and the wheel 40 connected to the speed reducer 30.

The driving wheel 15 thus configured can include the speed reducer 30 having a larger output than a speed reducer having a dimension in accordance with the diameter Dw of the wheel 40. More specifically, in the speed reducer 30 included in the driving wheel 15, the maximum dimension W2 of the outer profile S2 of the case 33 as observed from a direction parallel to the rotation axis Ax can be larger than the diameter Dw of the wheel 40. In addition, the dimension of the inner profile S1 of the case 33 as observed from a direction parallel to the rotation axis Ax can be set in accordance with the maximum dimension W2 of the outer profile S2. Thus, the dimension of the speed reducing mechanism 31 which is at least partially housed in the case 33 can be set in accordance with the dimension of the inner profile S1 of the case 33, and thus in accordance with the maximum dimension W2 of the outer profile S2. As a result, the output of the speed reducer 30 can be larger than that of a speed reducer having a dimension in accordance with the diameter Dw of the wheel 40.

The carriage 100 according to the embodiment includes the speed reducer 30 described above or the driving wheel 15 described above.

The carriage 100 thus configured can include the speed reducer 30 having a larger output than a speed reducer having a dimension in accordance with the diameter Dw of the wheel 40. More specifically, in the speed reducer 30 included in the carriage 100, the maximum dimension of the outer profile S2 of the case 33 as observed from a direction parallel to the rotation axis Ax can be larger than the diameter Dw of the wheel 40. In addition, the dimension of the inner profile S1 of the case 33 as observed from a direction parallel to the rotation axis Ax can be set in accordance with the maximum dimension W2 of the outer profile S2. Thus, the dimension of the speed reducing mechanism 31 which is at least partially housed in the case 33 can be set in accordance with the dimension of the inner profile S1 of the case 33, and thus in accordance with the maximum dimension W2 of the outer profile S2. As a result, the output of the speed reducer 30 can be larger than that of a speed reducer having a dimension in accordance with the diameter Dw of the wheel 40.

The invention is not limited to the above-described embodiment and variations. For example, various modifications may be made to the elements of the embodiment and the variations described above. The invention also encompasses embodiments including components and/or methods other than the above-described components and/or methods. The invention also encompasses embodiments not including some elements of the above-described components and/or methods. Further, the invention produces not only the advantageous effects described above but also specific effects in accordance with specific configuration of the embodiments.

What is claimed is:

1. A driving wheel, comprising:
   a wheel; and
   a speed reducer that decelerates rotation input thereto and outputs decelerated rotation to the wheel,
   wherein the speed reducer comprises a case, an input portion that receives the rotation input, and an output portion that outputs the decelerated rotation to the wheel;
   wherein a rotation axis of the input portion is aligned with a rotation axis of the output portion;
   wherein a part of the case of the speed reducer facing a traveling surface is positioned closer to a rotation axis of the wheel than is an outer edge of the wheel, and another part of the case other than said part is positioned more distant from the rotation axis of the wheel than is the outer edge of the wheel; and
   wherein, when observed from a direction parallel to the rotation axis of the wheel, said another part other than said part is positioned at a distance from the rotation axis in a direction parallel to the traveling surface.

2. The driving wheel of claim 1, wherein said part of the case facing the traveling surface includes a plane surface or a curved surface having a radius of curvature larger than a distance from the rotation axis of the wheel to said part.

3. The driving wheel of claim 1, wherein a part of the case opposite to a side facing the traveling surface is positioned closer to the rotation axis of the wheel than is the outer edge of the wheel.

4. The driving wheel of claim 3, wherein the case is mounted to a carriage body such that said part of the case opposite to the side facing the traveling surface contacts with the carriage body.

5. The driving wheel of claim 1, wherein the case is provided with a reinforcement portion.

6. The driving wheel of claim 5, wherein the reinforcement portion includes at least one of an extension portion extending in a direction parallel to the traveling surface and a thick portion disposed along said part facing the traveling surface.

7. A carriage comprising the driving wheel of claim 1.

* * * * *